(12) United States Patent
Meredith

(10) Patent No.: US 7,755,583 B2
(45) Date of Patent: Jul. 13, 2010

(54) METHOD TO REDUCE POWER CONSUMPTION WITH ELECTRO-OPTIC LENSES

(75) Inventor: Gerald Meredith, Tucson, AZ (US)

(73) Assignee: Johnson & Johnson Vision Care Inc, Jacksonville, FL (US)

( * ) Notice: Subject to any disclaimer, the term of this patent is extended or adjusted under 35 U.S.C. 154(b) by 314 days.

(21) Appl. No.: 11/760,879

(22) Filed: Jun. 11, 2007

(65) Prior Publication Data

US 2007/0290972 A1 Dec. 20, 2007

Related U.S. Application Data

(60) Provisional application No. 60/804,494, filed on Jun. 12, 2006.

(51) Int. Cl.
*G09G 3/36* (2006.01)
(52) U.S. Cl. .......................... 345/87; 345/94; 349/167
(58) Field of Classification Search ........... 345/87–100; 349/123, 158, 201, 153, 167, 168
See application file for complete search history.

(56) References Cited

U.S. PATENT DOCUMENTS

| | | | |
|---|---|---|---|
| 3,309,162 A | 3/1967 | Kosanke et al. | |
| 4,205,311 A | 5/1980 | Kutaragi | |
| 4,303,913 A * | 12/1981 | Tohda et al. | 345/75.1 |
| 4,319,484 A * | 3/1982 | Keller | 73/304 C |
| 4,382,659 A * | 5/1983 | Aoki et al. | 349/83 |
| 4,386,836 A * | 6/1983 | Aoki et al. | 349/3 |
| 4,466,703 A | 8/1984 | Nishimoto | |
| 4,671,618 A * | 6/1987 | Wu et al. | 349/92 |
| 4,909,626 A | 3/1990 | Purvis et al. | |
| 4,921,728 A * | 5/1990 | Takiguchi et al. | 427/58 |
| 4,927,241 A | 5/1990 | Kuijk | |
| 5,040,876 A | 8/1991 | Patel et al. | |
| 5,150,234 A | 9/1992 | Takahashi et al. | |
| 5,150,241 A * | 9/1992 | Joffre et al. | 349/140 |

(Continued)

FOREIGN PATENT DOCUMENTS

EP    0 233 104    8/1987

(Continued)

OTHER PUBLICATIONS

Supplementary European Search Report for European Application No. EP 07 79 8357 completed on Oct. 22, 2009.

(Continued)

*Primary Examiner*—Kimnhung Nguyen
(74) *Attorney, Agent, or Firm*—Pearl Cohen Zedek Latzer, LLP

(57) ABSTRACT

Provided is an electro-optic device having reduced power consumption. More specifically, an electro-optic device is provided comprising: a liquid crystal layer between a pair of opposing transparent substrates; a patterned electrode set positioned between the liquid crystal layer and the inward-facing surface of the first transparent substrate; a conductive layer between the liquid crystal layer and the inward-facing surface of the second transparent substrate; and means for applying voltage to the patterned electrode set and the conductive layer, wherein the voltage applied to the conductive layer is below the threshold voltage (the RMS voltage difference above which the optical transmission of the liquid crystal layer changes).

13 Claims, 4 Drawing Sheets

U.S. PATENT DOCUMENTS

| | | | |
|---|---|---|---|
| 5,682,223 | A | 10/1997 | Menezes et al. |
| 5,815,233 | A | 9/1998 | Morokawa et al. |
| 5,877,876 | A | 3/1999 | Birdwell |
| 6,191,881 | B1 | 2/2001 | Tajima |
| 6,437,762 | B1 | 8/2002 | Birdwell |
| 6,464,363 | B1 | 10/2002 | Nishioka et al. |
| 6,619,799 | B1 | 9/2003 | Blum et al. |
| 6,768,536 | B2 | 7/2004 | Okuwaki et al. |
| 6,778,246 | B2 | 8/2004 | Sun et al. |
| 6,859,333 | B1 | 2/2005 | Ren et al. |
| 7,019,890 | B2 | 3/2006 | Meredith et al. |
| 7,209,097 | B2 | 4/2007 | Suyama et al. |
| 7,264,354 | B2 | 9/2007 | Blum et al. |
| 7,388,565 | B2 * | 6/2008 | Khurana et al. ............. 345/87 |
| 2001/0028028 | A1 * | 10/2001 | Iwasaki et al. ............. 250/216 |
| 2003/0210377 | A1 | 11/2003 | Blum et al. |
| 2004/0057096 | A1 | 3/2004 | Amada et al. |
| 2004/0105038 | A1 | 6/2004 | Hashimoto et al. |
| 2004/0108971 | A1 | 6/2004 | Waldern et al. |
| 2005/0116908 | A1 | 6/2005 | Mi et al. |
| 2005/0185135 | A1 | 8/2005 | Blum et al. |
| 2005/0231677 | A1 | 10/2005 | Meredith |
| 2006/0012594 | A1 | 1/2006 | Worley, III et al. |
| 2006/0022919 | A1 | 2/2006 | Martinot-Lagarde et al. |
| 2006/0082559 | A1 | 4/2006 | Louwsma et al. |
| 2006/0092340 | A1 | 5/2006 | Blum et al. |
| 2006/0109226 | A1 | 5/2006 | Tyrrell et al. |
| 2006/0164593 | A1 | 7/2006 | Peyghambarian et al. |
| 2006/0256244 | A1 * | 11/2006 | Jak et al. ............. 349/33 |
| 2006/0256271 | A1 * | 11/2006 | Shimoshikiryo ............. 349/144 |
| 2007/0052920 | A1 | 3/2007 | Stewart et al. |
| 2009/0015785 | A1 | 1/2009 | Blum et al. |

FOREIGN PATENT DOCUMENTS

| | | |
|---|---|---|
| EP | 0 237 365 | 9/1987 |
| JP | 05-100201 | 4/1993 |

OTHER PUBLICATIONS

U.S. Appl. No. 12/410,889, filed Mar. 25, 2009, McGinn et al.

International Preliminary Report on Patentability for International Application No. PCT/US2006/001879, Issued on Oct. 30, 2007.

International Search Report for International Application No. PCT/US07/76994, mailed on Jun. 10, 2008.

International Search Report for International Application No. PCT/US07/70827, mailed on Aug. 27, 2008.

International Preliminary Report on Patentability for International Application No. PCT/US07/70827, Issued on Dec. 31, 2008.

Naumov et al., "Control Optimization of Spherical Modal Liquid Crystal Lenses", Optics Express, vol. 4, No. 9, pp. 344-352, Apr. 26, 1999.

Kowel et al., "Focusing by Electrical Modulation of Refraction in a Liquid Crystal Cell", Applied Optics, vol. 23, No. 2, pp. 278-289, Jan. 15, 1984.

Naumov et al., "Liquid-Crystal Adaptive Lenses With Modal Control", Optics Letters, vol. 23, No. 13, pp. 992-994, Jul. 1, 1998.

Kotova et al., "Modal Liquid Crystal Wavefront Corrector", Optics Express, vol. 10, No. 22, pp. 1258-1272, Nov. 4, 2002.

Vdovin et al., "On the Possibility of Intraocular Adaptive Optics", Optics Express, vol. 11, No. 7, pp. 810-817, Apr. 7, 2003.

Thibos et al., "Use of Liquid-Crystal Adaptive-Optics to Alter the Refractive State of the Eye", Optometry and Vision Science, vol. 74, No. 7, pp. 581-587, Jul. 1997.

Loktev et al., "Wave Front Control Systems Based on Modal Liquid Crystal Lenses", Review of Scientific Instruments, vol. 71, No. 9, pp. 3290-3297, Sep. 2000.

Smith et al., "The Eye and Visual Optical Instruments", Cambridge University Press, 1997.

* cited by examiner

METHOD TO REDUCE POWER CONSUMPTION WITH ELECTRO-OPTIC LENSES

CROSS-REFERENCE TO RELATED APPLICATIONS

This application claims the benefit of U.S. Provisional Application No. 60/804,494, filed Jun. 12, 2006, which is incorporated by reference herein.

BACKGROUND OF THE INVENTION

This invention relates to electro-optic lenses having reduced power consumption.

Electro-optic devices have been developed for use in many applications, including spectacle lenses, optical systems, liquid crystal displays and other devices. It is desired that the power required to drive the device be as low as possible, to allow long device life before recharging and to permit smaller power sources to be used, among other benefits.

SUMMARY OF THE INVENTION

Provided is an electro-optic device having reduced power consumption. More specifically, an electro-optic device is provided comprising: a liquid crystal layer between a pair of opposing transparent substrates; a patterned electrode set positioned between the liquid crystal layer and the inward-facing surface of the first transparent substrate; a conductive layer between the liquid crystal layer and the inward-facing surface of the second transparent substrate; and means for applying voltage to the patterned electrode set and the conductive layer, wherein the voltage applied to the conductive layer is below the threshold voltage (the RMS voltage difference above which the optical transmission of the liquid crystal layer changes). In one particular embodiment, the voltage difference between the voltage applied to the patterned electrode set and the voltage applied to the conductive layer is sufficient to provide the desired amount of optical transmission change in the liquid crystal.

As known in the art, substantially homogenously aligned liquid crystals have a surface anchoring energy and significant elastic constants that result in no director reorientation at RMS voltages below a threshold level ($V_{Th}$). If the RMS voltage applied across the liquid crystal is higher than $V_{Th}$, the director reorients and the optical transmission changes until saturation is reached. In previous designs, to reorient the liquid crystal, a voltage was applied across the liquid crystal using the conductive layer as a ground. This applied voltage was at least the sum of the threshold voltage and the additional amount of voltage to reorient the director to the desired extent. In this invention, the conductive layer (unpatterned electrode) is driven near the threshold voltage. This allows the patterned electrode to be driven at a lower voltage than in previous designs.

In one example of the current invention, the threshold voltage is about 1.3 V RMS. In this case, a voltage below 1.3 V RMS is applied to the conductive layer. The voltage applied to the patterned electrodes is sufficient such that the liquid crystal director reorients to provide the desired optical transmission. This voltage is less than in previous designs.

The devices of the invention can be used in a variety of applications known in the art, including lenses used for human or animal vision correction or modification. The lenses can be incorporated in spectacles, as known in the art. Spectacles can include one lens or more than one lens. The devices may also be used in display applications, as known to one of ordinary skill in the art without undue experimentation. The lenses of the invention can be used with conventional lenses and optics.

The devices of this invention offer many advantages over other designs. Previous work indicated that the electronic drivers that drive the liquid crystal consume the majority of the power supply's energy. The use of this invention reduces the power consumed by the electronics that drive the liquid crystal. With the use of this invention, lower voltage power supplies can be used. Since the devices described herein may be used as components of eyewear, where the power supply can be a battery, a lower voltage power supply will allow the use of a smaller battery, and reduced power consumption will extend the time between battery charges.

DETAILED DESCRIPTION OF THE INVENTION

The following description provides non-limiting details of constructing the electro-optic lenses of the present invention. This invention provides electro-optic lenses filled with liquid crystal material that can be realigned in an electric field. The lenses function as diffractive-optical-elements (DOE). DOE are the result of applying voltages across a thin liquid-crystal layer which responds by altering the director-orientation field and creates nonuniform refractive-index patterns which then lead to a nonuniform phase-transmission-function (PTF) across the face of the cell. Accurate control of the PTF to create the desired DOE is achieved by applying an accurately controlled voltage difference across the cell by driving the patterned electrode set and the conductive layer.

The electro-optic lens used in the present invention is a diffractive lens using a patterned electrode set to produce the desired distribution of phase retardations that allows the lens to function as a zone-plate lens. Diffractive lenses are known in the art. The function of a diffractive lens is based on near-field diffraction by a Fresnel zone pattern. Each point emerging from the structure serves as an emitter of a spherical wave. The optical field at a particular observing point is a summation of the contributions of the emitted spherical waves over the entire structure. Constructive interference of the spherical waves coming from the various points creates a high intensity at the observation point, corresponding to a high diffraction efficiency.

Figure 1:
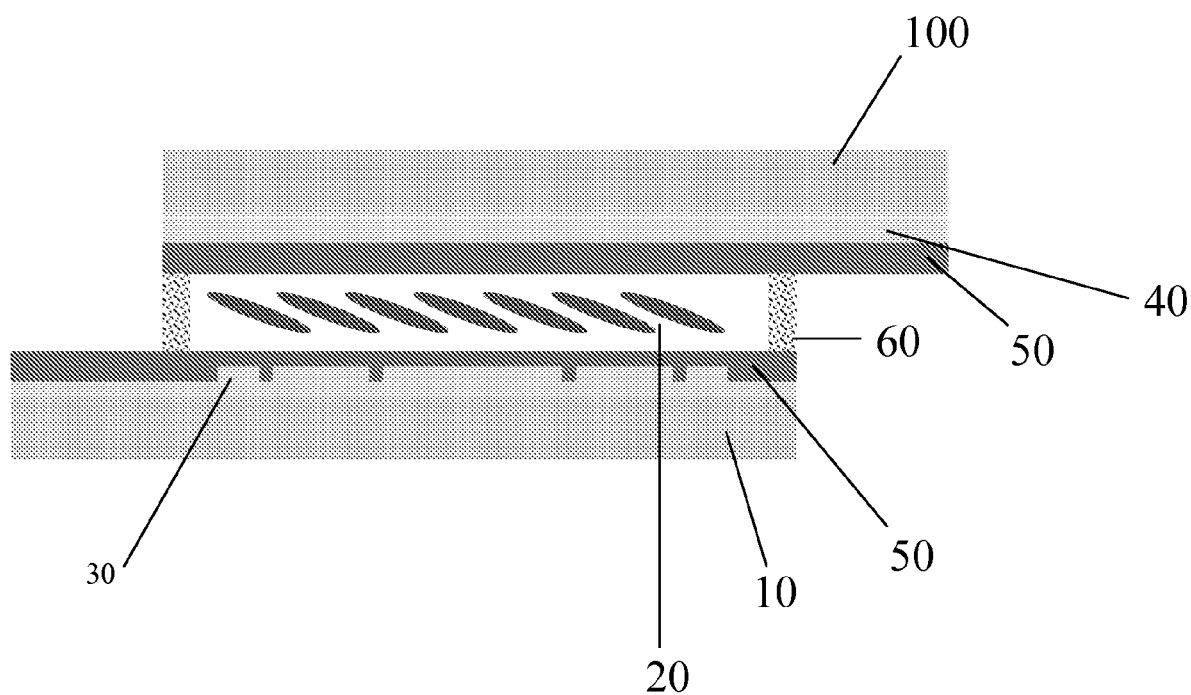
FIG. 1 shows an illustration of a liquid crystal cell.
Figure 2:
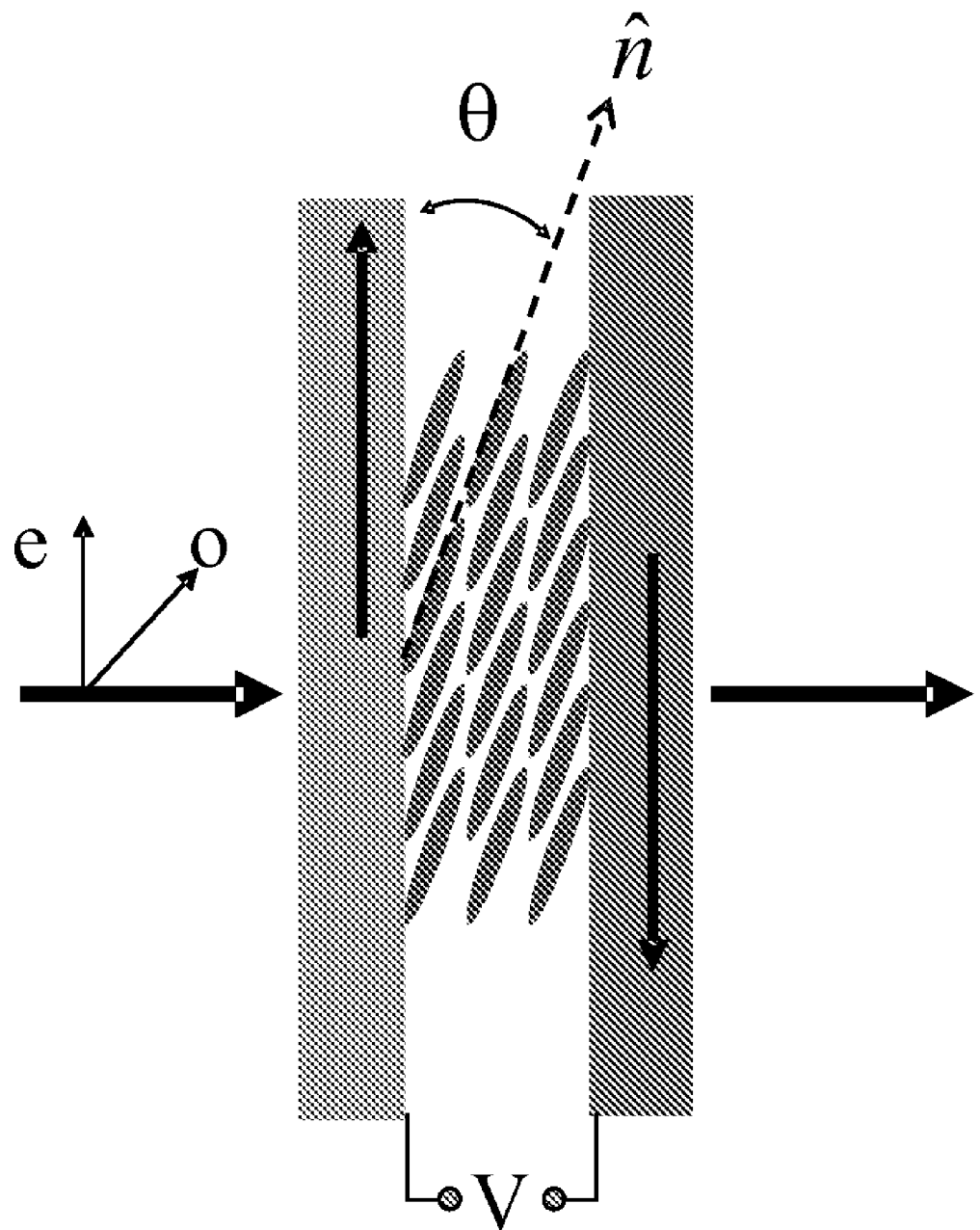
FIG. 2 shows the previous design where a voltage is applied across a liquid crystal cell.
Figure 3:
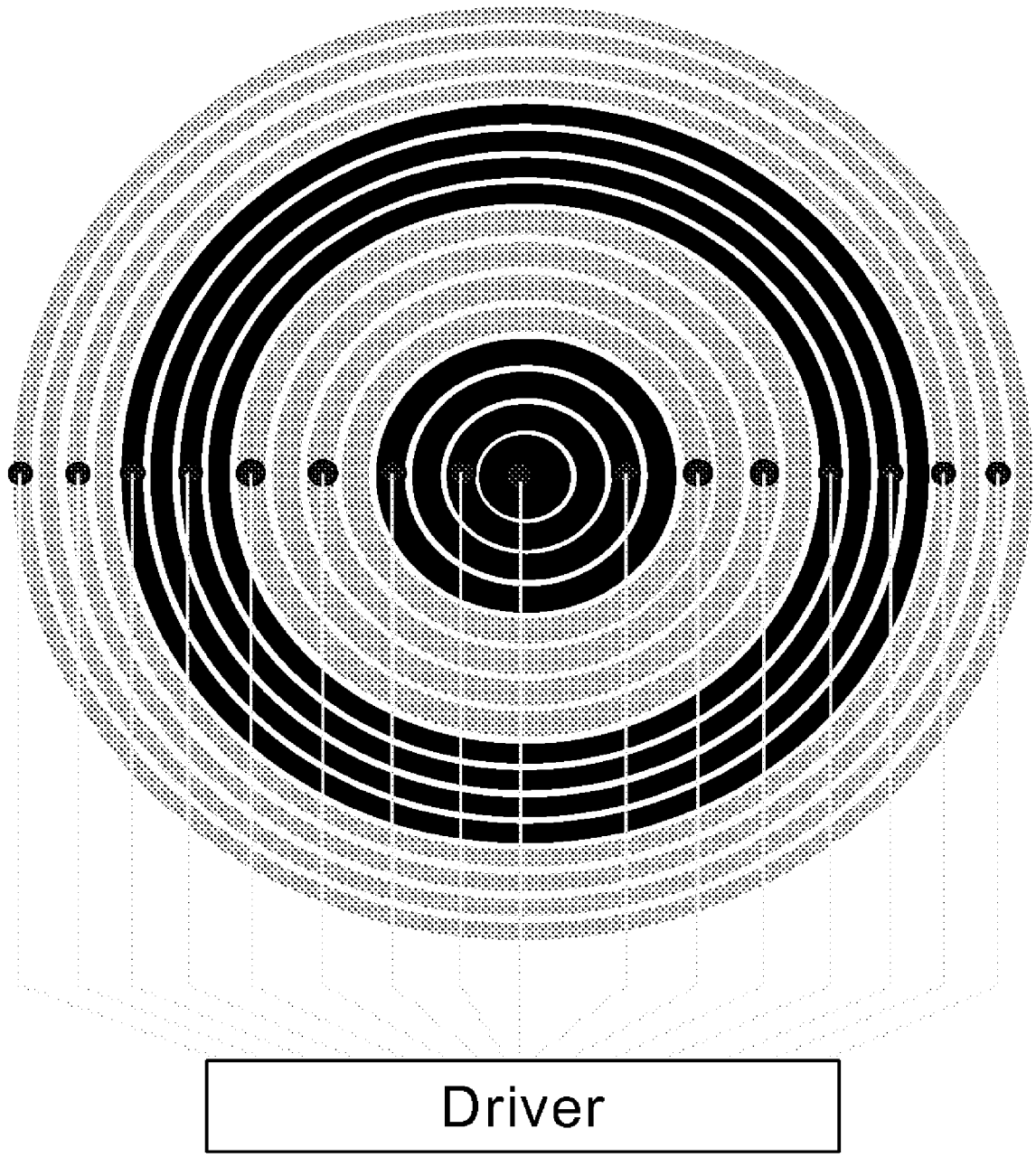
FIG. 3 shows one example of a patterned electrode set.

Liquid crystal cells are known in the art. All art-known cell configurations and operations of liquid crystal cells are incorporated by reference to the extent they are not incompatible with the disclosure herewith. As one example, consider an electro-active liquid crystal cell, as shown in FIG. 1, where liquid crystal material (20) is sandwiched between two substrates (100, 10) that have conductive inner surfaces (40, 30). The substrates can be any material that can provide desired optical transmission and can function in the devices and methods described herein, such as quartz, glass or plastic, as known in the art. Conductive layer 30 is patterned with a patterned electrode set to provide the desired diffraction pattern. The patterned electrodes consist of a circular array of rings whose radii are determined by the focal length desired, as described elsewhere (see for example, references cited herein and US application 2004/0223113). The patterned electrode is fabricated by photolithographic processing of a conductive film deposited on a substrate, or other techniques, as known in the art. FIG. 3 illustrates the layout of one example of an electrode pattern. Adjacent zones are distinguished by grey and black colors. Each ring electrode is independently addressable by adding an electrical insulation layer with vias (represented by dots). Conductive layer 40 is not patterned. The conductive material used for the conductive layers may be any suitable material, including those specifically described herein, and other materials known in the art. It is preferred that the conductive material be transparent, such as indium oxide, tin oxide or indium tin oxide (ITO). The thickness of each conducting layer is typically between 30 nm and 200 nm. The layer must be thick enough to provide adequate conduction, but not so thick as to provide excess thickness to the overall lens structure. The substrates are kept at a desired distance with spacers (60), or other means known in the art. Spacers may be any desired material such as Mylar, glass or quartz, or other materials useful to provide the desired spacing. In order to achieve efficient diffraction the liquid crystal layer must be thick enough to provide one wave of activated retardation (d>$\lambda$/$\delta$n~2.5 $\mu$m, where $\delta$n is the birefringence of the liquid crystal media), but thicker liquid crystal layers help to avoid saturation phenomena. Disadvantages of thicker cells include long switching times (varying as $d^2$) and loss of electro-optic feature definition. In particular embodiments, the transparent substrates are spaced between three and 20 microns apart, and all individual values and ranges therein. One currently preferred spacing is 5 microns. The surfaces of the substrates are coated with an alignment layer (50), such as polyvinylalcohol (PVA) or nylon 6,6 and are treated by rubbing to give a homogeneous director orientation. It is preferred that the alignment layer on one substrate is rubbed antiparallel from the alignment layer on the other substrate as shown by the arrows in FIG. 2. This allows proper alignment of the liquid crystal, as known in the art.

Voltage is applied to the patterned electrode set and conductive layer using means known in the art. In previous lens configurations, a voltage is applied to the inner conductive surfaces of the substrates as shown in FIG. 2. The symbols used in FIG. 2 are conventional in the art. In the previous lens configurations, one conductive layer served as a ground. In one embodiment of the present invention, one driver circuit is attached to the conductive layer and a separate driver circuit is attached to the patterned electrode set. Electrical contacts can be made to the electrodes using thin wires or conductive strips at the edge of the lens, or by a set of conducting vias down the lens, as known in the art. The voltages supplied to the conductive layer and patterned electrode set are dependent on the particular liquid crystal used, the thickness of the liquid crystal in the cell, the desired optical transmission, and other factors, as known in the art. The actual voltages used can be determined by one of ordinary skill in the art without undue experimentation using the knowledge of the art and the disclosure herein. It is known in the art that various methods of controlling all aspects of the voltage applied to electrodes can be used, including a processor, a microprocessor, an integrated circuit, and a computer chip.

Since voltages are not absolute physical quantities, they must be specified relative to a reference (e.g. a local ground, a battery electrode or a power-supply terminal). Thus the voltage that alters the stress and strain in a liquid crystal (LC) film is actually determined by the difference between voltages at the electrodes on opposing sides of the film. It is well known that LC films respond slowly (at low frequencies) to the RMS average of the higher-frequency variations (written as $<V^2>^{1/2}$) of these voltage differences. To control such films commonly one electrode is kept at fixed voltage $V_2=V_{ref}$ (e.g. at local ground). In that case the modulating voltage $V_{rms}$ is determined completely by the behavior of voltage $V_1$ on the other electrode:

$$V_{rms}=<(V_1-V_2)^2>^{1/2}=<(V_1-V_{ref})^2>^{1/2}=<(V_1)^2>^{1/2}$$

if voltages are expressed relative to $V_{ref}$. However, when $V_2$ is not held at $V_{ref}$, then one can only say that $$V_{rms}=<(V_1-V_2)^2>^{1/2}.$$

In that case synchronization of electrode drive voltages can cause the values of $V_{rms}$ to occur in the range $$V_{rms1}+V_{rms2} \geq V_{rms} \geq |V_{rms1}-V_{rms2}|.$$

Figure 4:
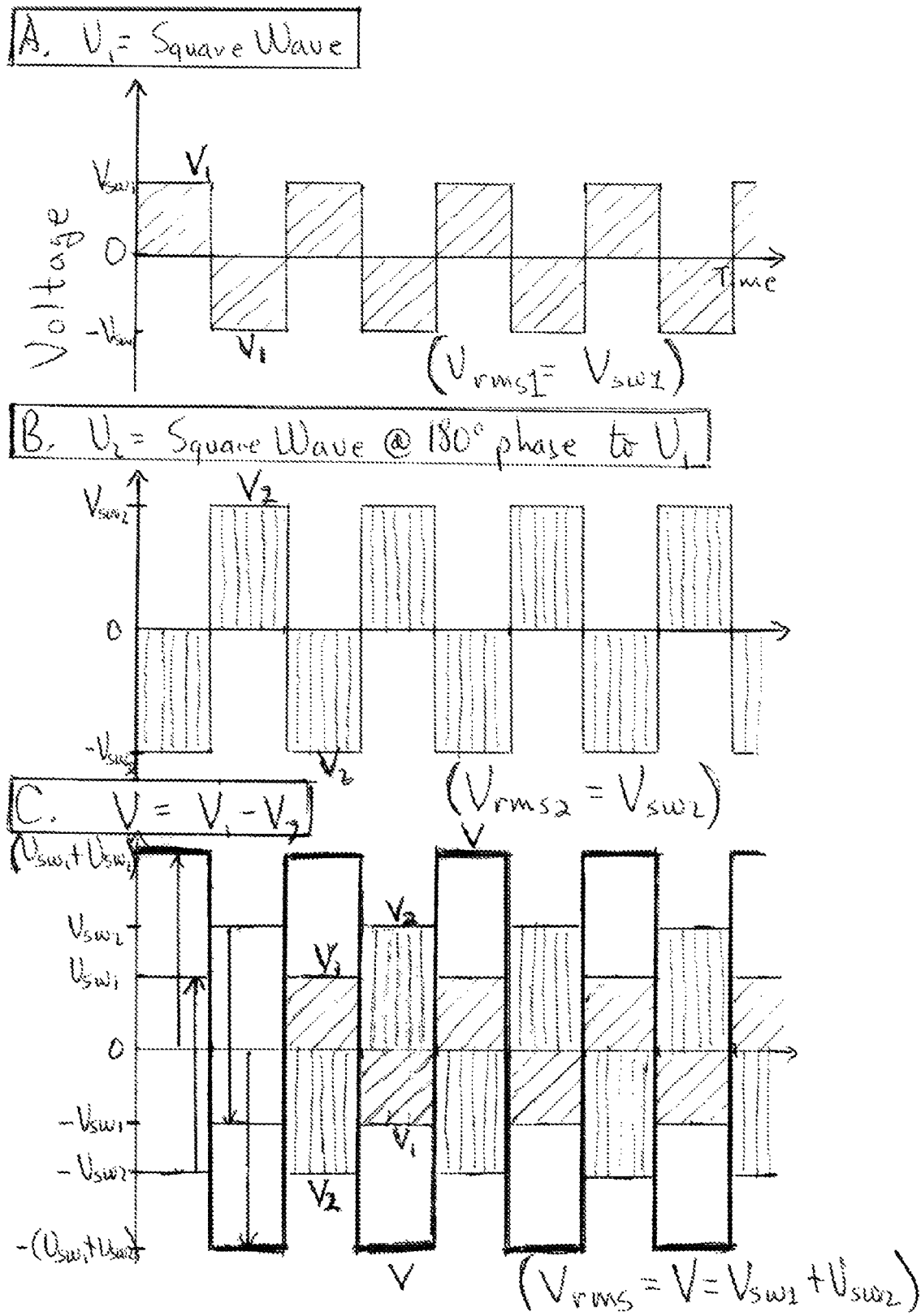
FIG. 4 shows the use of oppositely phased square-wave drivers.

An important example, the use of oppositely phased square-wave drives to provide a large modulating $V_{rms}$ from two lower-voltage drivers, is shown in the accompanying FIG. 4. Obviously $V_2$ can be kept constant as a square-wave with amplitude $V_{sw2}$ and $V_1$ can be applied as a square wave that is 180 degrees out-of-phase with respect to $V_2$ that can be varied in amplitude $V_{sw1}$ to achieve the desired controlling voltage. For this situation, as shown in FIG. 4, $$V_{rms}=V_{rms1}+V_{rms2}=V_{sw1}+V_{sw2}.$$

So, as mentioned herein, if $V_{rms2}=V_{sw2}$ is set near but below the LC film's threshold voltage, then smaller $V_{rms1}=V_{sw1}$ values can be used to control a LC DOE. (An alternative would be to fix $V_{sw1}$ and to vary the phase difference between the square waves to achieve the desired $V_{rms}$ within the range $$V_{sw1}+V_{sw2} \geq V_{rms2} \geq |V_{sw1}-V_{sw2}|.)$$

Use of square waves is illustrative, but is only a simple example. Similar control of $V_{rms}$ can be achieved through control of amplitude and phase with other drive wave-forms (e.g. sine waves, imperfect square waves and other methods known in the art.).

As used herein, "layer" does not require a perfectly uniform film. Some uneven thicknesses, cracks or other imperfections may be present, as long as the layer performs its intended purpose, as described herein. As used herein, a "patterned electrode set" means one or more areas of conductive material arranged in a pattern on a substrate, along with one or more areas of insulating material arranged in a complementary pattern with said areas of conductive material on said substrate.

The liquid crystal used in the invention include those that form nematic, smectic, or cholesteric phases that possess a long-range orientational order that can be controlled with an electric field. It is preferred that the liquid crystal have a wide nematic temperature range, easy alignability, low threshold voltage, large electro-optic response and fast switching speeds, as well as proven stability and reliable commercial availability. In one preferred embodiment, E7 (a nematic liquid crystal mixture of cyanobiphenyls and cyanoterphenyls sold by Merck) is used. Examples of other nematic liquid crystals that can be used in the invention are: pentyl-cyanobiphenyl (5CB), (n-octyloxy)-4-cyanobiphenyl (8OCB). Other examples of liquid crystals that can be used in the invention are the n=3, 4, 5, 6, 7, 8, 9, of the compounds 4-cyano-4-n-alkylbiphenyls, 4-n-pentyloxy-biphenyl, 4-cyano-4"-n-alkyl-p-terphenyls, and commercial mixtures such as E36, E46, and the ZLI-series made by BDH (British Drug House)-Merck.

Electroactive polymers can also be used in the invention. Electroactive polymers include any transparent optical polymeric material such as those disclosed in "Physical Properties of Polymers Handbook" by J. E. Mark, American Institute of Physics, Woodbury, N.Y., 1996, containing molecules having unsymmetrical polarized conjugated p electrons between a donor and an acceptor group (referred to as a chromophore) such as those disclosed in "Organic Nonlinear Optical Materials" by Ch. Bosshard et al., Gordon and Breach Publishers, Amsterdam, 1995. Examples of polymers are as follows: polystyrene, polycarbonate, polymethylmethacrylate, polyvinylcarbazole, polyimide, polysilane. Examples of chromophores are: paranitroaniline (PNA), disperse red 1 (DR 1), 3-methyl-4-methoxy-4'-nitrostilbene, diethylaminonitrostilbene (DANS), diethyl-thio-barbituric acid. Electroactive polymers can be produced by: a) following a guest/host approach, b) by covalent incorporation of the chromophore into the polymer (pendant and main-chain), and/or c) by lattice hardening approaches such as cross-linking, as known in the art.

Polymer liquid crystals (PLCs) may also be used in the invention. Polymer liquid crystals are also sometimes referred to as liquid crystalline polymers, low molecular mass liquid crystals, self-reinforcing polymers, in situ-composites, and/or molecular composites. PLCs are copolymers that contain simultaneously relatively rigid and flexible sequences such as those disclosed in "Liquid Crystalline Polymers: From Structures to Applications" by W. Brostow; edited by A. A. Collyer, Elsevier, New-York-London, 1992, Chapter 1. Examples of PLCs are: polymethacrylate comprising 4-cyanophenyl benzoate side group and other similar compounds.

Polymer dispersed liquid crystals (PDLCs) may also be used in the invention. PDLCs consist of dispersions of liquid crystal droplets in a polymer matrix. These materials can be made in several ways: (i) by nematic curvilinear aligned phases (NCAP), by thermally induced phase separation (TIPS), solvent-induced phase separation (SIPS), and polymerization-induced phase separation (PIPS), as known in the art. Examples of PDLCs are: mixtures of liquid crystal E7 (BDH-Merck) and NOA65 (Norland products, Inc. NJ); mixtures of E44 (BDH-Merck) and polymethylmethacrylate (PMMA); mixtures of E49 (BDH-Merck) and PMMA; mixture of the monomer dipentaerythrol hydroxy penta acrylate, liquid crystal E7, N-vinylpyrrolidone, N-phenylglycine, and the dye Rose Bengal.

Polymer-stabilized liquid crystals (PSLCs) can also be used in the invention. PSLCs are materials that consist of a liquid crystal in a polymer network in which the polymer constitutes less than 10% by weight of the liquid crystal. A photopolymerizable monomer is mixed together with a liquid crystal and an UV polymerization initiator. After the liquid crystal is aligned, the polymerization of the monomer is initiated typically by UV exposure and the resulting polymer creates a network that stabilizes the liquid crystal. For examples of PSLCs, see, for instance: C. M. Hudson et al. Optical Studies of Anisotropic Networks in Polymer-Stabilized Liquid Crystals, Journal of the Society for Information Display, vol. 5/3, 1-5, (1997), G. P. Wiederrecht et al, Photorefractivity in Polymer-Stabilized Nematic Liquid Crystals, J. of Am. Chem. Soc., 120, 3231-3236 (1998).

Self-assembled nonlinear supramolecular structures may also be used in the invention. Self-assembled nonlinear supramolecular structures include electroactive asymmetric organic films, which can be fabricated using the following approaches: Langmuir-Blodgett films, alternating polyelectrolyte deposition (polyanion/polycation) from aqueous solutions, molecular beam epitaxy methods, sequential synthesis by covalent coupling reactions (for example: organotrichlorosilane-based self-assembled multilayer deposition). These techniques usually lead to thin films having a thickness of less than about 1 µm.

Every device or combination of components described or exemplified can be used to practice the invention, unless otherwise stated. Additional components such as drivers to apply the voltages used, controllers for the voltages and any additional required optical components are known to one of ordinary skill in the art and incorporated without undue experimentation. Specific names of compounds are intended to be exemplary, as it is known that one of ordinary skill in the art can name the same compounds differently.

When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and fabrication methods other than those specifically exemplified can be employed in the practice of the invention without resort to undue experimentation. All art-known functional equivalents, of any such methods, device elements, starting materials, and fabrication methods are intended to be included in this invention. Whenever a range is given in the specification, for example, a thickness range or a voltage range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed and described. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

In general the terms and phrases used herein have their art-recognized meaning, which can be found by reference to standard texts, journal references and contexts known to those skilled in the art. Specific definitions are provided to clarify their specific use in the context of the invention. All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The devices and methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

All references cited herein are hereby incorporated by reference to the extent that there is no inconsistency with the disclosure of this specification. Some references provided herein are incorporated by reference herein to provide details concerning additional device components, additional liquid crystal cell configurations, additional patterns for patterned electrodes, additional methods of analysis and additional uses of the invention.

Although the description herein contains many specificities, these should not be construed as limiting the scope of the invention, but merely providing examples of some of the presently preferred embodiments of the invention. The invention is not limited in use to spectacles. Rather, as known by one of ordinary skill in the art, the invention is useful in other fields such as telecommunications, optical switches and medical devices. Any liquid crystal or mixture of liquid crystals that provides the desired phase transmission function at the desired wavelength is useful in the invention, as known by one of ordinary skill in the art. Determining the proper voltage and applying the proper voltage to liquid crystal materials to produce a desired phase transmission function is known in the art.

REFERENCES

G. Smith et al., The eye and visual optical instruments, Cambridge University Press, 1997.

G. Vdovin et al., On the possibility of intraocular adaptive optics, Opt. Express 11:810-817, 2003.

G. Williams et al., Electrically controllable liquid crystal Fresnel lens, Proc. SPIE 1168:352-357, 1989.

J. S. Patel et al., Electrically controlled polarization-independent liquid-crystal Fresnel lens arrays, Opt. Lett. 16:532-534, 1991.

B. Dance, Liquid crystal used in switchable Fresnel lens, Laser Focus World 28:34, 1992.

M. C. K. Wiltshire, Non-display applications of liquid crystal devices, Geo J. Research 10:119-125, 1993.

H. Ren et al., Tunable Fresnel lens using nanoscale polymer-dispersed liquid crystals, Appl. Phys. Lett. 83:1515-1517, 2003.

C. W. Fowler et al., Liquid crystal lens review, Ophthal. Physiol. Opt. 10:186-194, 1990.

J. A. Futhey, Diffractive bifocal intraocular lens, Proc. SPIE 1052:142-149, 1989.

S. Sato et al., Variable-focus liquid crystal Fresnel lens, Jpn. J. Appl. Phys. 24:L626-L628, 1985.

L. G. Commander et al., Variable focal length microlenses, Opt. Commun. 177:157-170, 2000.

S. T. Kowel et al., Focusing by electrical modulation of refraction in a liquid crystal cell, Appl. Opt. 23:278-289, 1984.

A. Nouhi et al., Adaptive spherical lens, Appl. Opt. 23:2774-2777, 1984.

A. F. Naumov et al., Liquid-crystal adaptive lenses with modal control, Opt. Lett. 23:992-994, 1998.

M. Y. Loktev et al., Wave front control systems based on modal liquid crystal lenses, Rev. Sci. Instrum. 71:3190-3297, 2000.

N. A. Riza et al., Three-terminal adaptive nematic liquid-crystal lens device, Opt. Lett. 19:1013-1015, 1994.

P. W. McOwan et al., A switchable liquid crystal binary Gabor lens, Opt. Commun. 103:189-193, 1993.

S. Masuda et al., Liquid-crystal microlens with a beam-steering function, Appl. Opt. 36:4772-4778, 1997.

B. Kress et al., Digital Diffractive Optics, John Wiley & Sons Ltd., 2000.

I claim:

1. An electro-optic device comprising:
   a patterned electrode layer and a non-patterned electrode layer;
   a liquid crystal layer disposed therebetween; and
   means for applying voltage to both of the electrode layers, wherein the voltage applied to each electrode layer is out-of-phase with respect to the voltage applied to the other electrode layer so that the voltages applied to the electrode layers constructively interfere so that the total voltage across the liquid crystal layer is greater than or equal to the voltage needed to change the optical transmission thereof, wherein the root mean square of the voltage applied to each electrode layer is below the root mean square of the voltage needed to change the optical transmission of the liquid crystal layer and wherein the voltage applied to both of the electrode layers constructively interferes so that the root mean square of the total voltage is greater than or equal to the root mean square of the voltage needed to change the optical transmission of the liquid crystal layer.

2. The device of claim 1, wherein the voltages applied to each electrode layer are 180° out-of-phase.

3. The device of claim 1, wherein the voltages applied to each electrode layer are square waves.

4. The device of claim 1, wherein the voltages applied to each electrode layer are sinusoidal waves.

5. The device of claim 1, wherein the electrodes layers are indium-tin-oxide.

6. The device of claim 1, further comprising transparent substrates disposed on an outward-facing surface of the electrode layers.

7. The device of claim 6, wherein the transparent substrates are glass.

8. The device of claim 6, wherein the transparent substrates are plastic.

9. The device of claim 6, wherein the transparent substrates are between about 3 and about 20 microns apart.

10. The device of claim 6, wherein the transparent substrates are between about 3 and about 8 microns apart.

11. The device of claim 1, further comprising an alignment layer surrounding the liquid crystal layer.

12. The device of claim 11, wherein the alignment layer is polyvinyl alcohol.

13. The device of claim 11, wherein the alignment layer is nylon 6,6.

* * * * *